(12) United States Patent
Fan et al.

(10) Patent No.: US 9,276,485 B2
(45) Date of Patent: Mar. 1, 2016

(54) CONTROL CIRCUIT FOR CONTROLLING REVERSE SURGE CURRENT IN A SYNCHRONOUS RECTIFICATION CIRCUIT AND POWER SUPPLY DEVICE INCLUDING THE CONTROL CIRCUIT

(75) Inventors: Xiaodong Fan, Shenzhen (CN); Lei Feng, Shenzhen (CN); Fugao Zhao, Shenzhen (CN); Zhihua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 960 days.

(21) Appl. No.: 12/982,197

(22) Filed: Dec. 30, 2010

(65) Prior Publication Data

US 2011/0317453 A1  Dec. 29, 2011

(30) Foreign Application Priority Data

Jun. 28, 2010 (CN) .......................... 2010 1 0212837

(51) Int. Cl.
*H02M 3/335* (2006.01)
*H02M 1/32* (2007.01)

(52) U.S. Cl.
CPC ...... *H02M 3/33592* (2013.01); *H02M 3/33515* (2013.01); *H02M 1/32* (2013.01); *Y02B 70/1475* (2013.01)

(58) Field of Classification Search
CPC ............ H02M 3/335; H02M 3/33507; H02M 3/33515; H02M 3/33523; H02M 3/33538; H02M 3/33546; H02M 3/33553; H02M 3/33576; H02M 3/33592
USPC .......... 363/21.04, 21.06, 21.07, 21.09, 21.12, 363/21.14, 21.15, 21.17, 55, 50, 56.01, 363/56.09, 56.1
See application file for complete search history.

(56) References Cited

U.S. PATENT DOCUMENTS 5,818,704 A  10/1998 Martinez
5,841,643 A * 11/1998 Schenkel .................. 363/21.13
(Continued)

FOREIGN PATENT DOCUMENTS

CN  1333592 A  1/2002
CN  1504014 A  6/2004
(Continued)

OTHER PUBLICATIONS

Office Action issued in corresponding Chinese Patent Application No. 201010212837.4, mailed Oct. 22, 2012.
(Continued)

*Primary Examiner* — Jeffrey Gblende
(74) *Attorney, Agent, or Firm* — Huawei Technologies Co., Ltd.

(57) ABSTRACT

A control circuit, a control method, and a power supply device are provided. The control circuit includes an obtaining module, adapted to obtain a voltage signal from a reverse surge current when the reverse surge current appears on a primary side of a switch power circuit of a synchronous rectification circuit; a maintaining module, adapted to continuously output a first control signal in a preset first time period when the voltage signal is greater than a preset first voltage threshold; and a control module, adapted to control and switch off switch tubes of the secondary side of the switch power circuit of the synchronous rectification circuit according to the first control signal. Thus, a reverse current surge of the switch power circuit of the synchronous rectification circuit can be effectively suppressed, and the safety of a switch power supply of the synchronous rectification circuit can be effectively protected.

15 Claims, 6 Drawing Sheets

(56) References Cited

U.S. PATENT DOCUMENTS

| | | | |
|---|---|---|---|
| 6,414,861 B1* | 7/2002 | Matsumoto et al. | 363/56.1 |
| 6,426,884 B1 | 7/2002 | Sun | |
| 6,580,626 B2* | 6/2003 | Takegami | 363/97 |
| 6,683,443 B2* | 1/2004 | Neild et al. | 323/282 |
| 8,259,470 B2* | 9/2012 | Fan et al. | 363/21.06 |
| 2003/0021128 A1* | 1/2003 | Brkovic | 363/17 |
| 2007/0008757 A1* | 1/2007 | Usui et al. | 363/125 |
| 2007/0041221 A1* | 2/2007 | Phadke et al. | 363/16 |
| 2007/0165429 A1 | 7/2007 | Selvaraju et al. | |
| 2008/0094861 A1* | 4/2008 | Wang | 363/21.11 |
| 2010/0177536 A1* | 7/2010 | Liu | 363/17 |

FOREIGN PATENT DOCUMENTS

| | | |
|---|---|---|
| CN | 1691480 A | 11/2005 |
| CN | 101141095 A | 3/2008 |
| CN | 201048354 Y | 4/2008 |
| CN | 101895207 A | 11/2010 |

OTHER PUBLICATIONS

International Search Report issued in corresponding PCT Patent Application No. PCT/CN2010/079589, mailed Apr. 7, 2011.

Written Opinion of the International Searching Authority issued in corresponding PCT Patent Application No. PCT/CN2010/079589, mailed Apr. 7, 2011.

Office Action issued in corresponding Chinese Patent Application No. 201010212837.4, mailed Mar. 5, 2013.

Office Action issued in corresponding Chinese Patent Application No. 201010212837,4, mailed Feb. 22, 2012.

Jinno et al., "Study on the Reverse Conduction of Synchronous Rectifiers", IEEE 2006.

Extended European Search Report issued in corresponding European Patent Application No. 10197123.2, mailed Mar. 28, 2011.

Office Action issued in corresponding European Patent Application No. 10197123.2, mailed Aug. 30, 2012.

Office Action mailed issued in commonly owned U.S. Appl. No. 13/270,045, filed Oct. 10, 2011.

Translation of search report and written Opinion issued in corresponding PCT application No. PCT/CN2010/079589, dated Apr. 7, 2011, total 11 pages.

Office Action issued in corresponding European Patent Application No. 10197123.2, mailed Aug. 26, 2013, 6 pages.

* cited by examiner

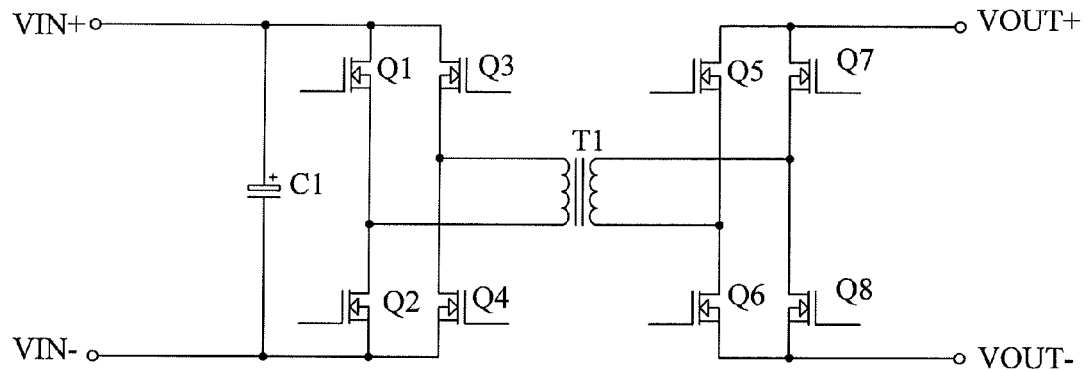
FIG. 1 <Prior Art>
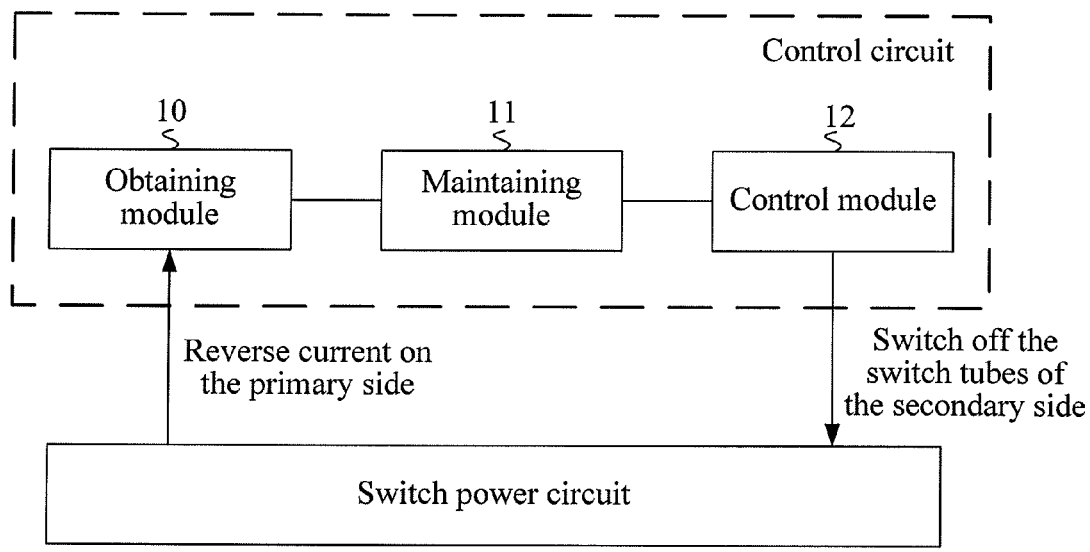
FIG. 2

CONTROL CIRCUIT FOR CONTROLLING REVERSE SURGE CURRENT IN A SYNCHRONOUS RECTIFICATION CIRCUIT AND POWER SUPPLY DEVICE INCLUDING THE CONTROL CIRCUIT

CROSS-REFERENCE TO RELATED APPLICATION

This application claims priority to Chinese Patent Application No. 201010212837.4, filed on Jun. 28, 2010, which is hereby incorporated by reference in its entirety.

FIELD OF THE DISCLOSURE

The present disclosure relates to the field of power supply technology, and in particular, to a control circuit, a control method, and a power supply device.

BACKGROUND

In the field of power supply technology, synchronous rectification circuits are widely used.

A switch power circuit of the traditional synchronous rectification circuit commonly uses a diode to implement the rectification; however, higher conduction loss of the diode leads to lower working efficiency of a switch power supply of the rectification circuit using the diode. Later, people gradually use a Metal-Oxide-Semiconductor Field-Effect-Transistor (MOSFET or MOS transistor) or other switch tubes to replace traditional diode to implement the synchronous rectification. FIG. 1 is a circuit diagram of the switch power circuit of the synchronous rectification circuit in the prior art. The switch tubes Q1 to Q4 are the switch tubes of a primary side of the switch power circuit of the synchronous rectification circuit. VIN+ and VIN− are input terminals of the primary side of the switch power circuit of the synchronous rectification circuit. The switch tubes Q5 to Q8 are the switch tubes of a secondary side of the switch power circuit of the synchronous rectification circuit. The switch tubes may be implemented in many forms, for example, through diode, transistor, or MOS transistor. In FIG. 1, all switch tubes Q1 to Q8 using the MOS transistor are taken as an example in the description. Referring to FIG. 1, VOUT+ and VOUT− are output terminals of the secondary side. T1 is an isolation transformer of the primary side and the secondary side of the switch power circuit of the synchronous rectification circuit, and a first capacitor C1 is an input filter capacitor of the primary side of the switch power circuit of the synchronous rectification circuit. As shown in FIG. 1, the switch tubes Q5-Q8 of the secondary side of the switch power circuit of the synchronous rectification circuit use the MOS transistors to replace the diodes in the prior art, so as to greatly reduce conduction loss and improve efficiency of the power supply. But after the MOS transistors are co nducted, the current flows bidirectionally. When an input power supply produces a low-impedance fall, the synchronous rectification technology will produce a great output reverse current surge, which may easily damage the MOS transistors. Therefore, the switch power supply of the synchronous rectification circuit using the MOS transistors has a potential risk in terms of the reliability.

In order to enhance the reliability of the switch power supply of the synchronous rectification circuit, in the prior art, an anti-reverse diode or the MOS transistor is added at a voltage input terminal of a switch tube rectification unit of the primary side, so as to quickly switch off the reverse current when an conduction current is reverse, thereby effectively protecting the switch power supply of the synchronous rectification circuit.

In the implementation of the present disclosure, the inventor finds that the prior art at least has the following problems. In the prior art, the anti-reverse diode or the MOS transistor is added to the voltage input terminal of the switch tube rectification unit of the primary side, which can prevent a reverse current surge produced by the power supply to the input terminal when the input power supply produces the low-impedance fall to some extent. However, the anti-reverse diode or the MOS transistor increases the system cost. Moreover, since the anti-reverse diode or the MOS transistor is configured in a main circuit of the switch power circuit of the synchronous rectification circuit, power consumption of the circuit is increased, and working efficiency of the power supply is reduced.

SUMMARY OF THE DISCLOSURE

Accordingly, the present disclosure is directed to a control circuit, a control method, and a power supply device to overcome a defect that a circuit for preventing a reverse current surge increases system cost and power consumption in the prior art, and effectively suppress the reverse current surge without increasing the cost and the power consumption.

An embodiment of the present disclosure provides a control circuit, comprising: an obtaining module, adapted to obtain a voltage signal from a reverse surge current when the reverse surge current appears on a primary side of a switch power circuit of a synchronous rectification circuit; a maintaining module, adapted to continuously output a first control signal in a preset first time period when the voltage signal is greater than a preset first voltage threshold; and a control module, adapted to control and switch off switch tubes of a secondary side of the switch power circuit of the synchronous rectification circuit according to the first control signal.

An embodiment of the present disclosure provides a power supply device, which includes a switch power circuit of a synchronous rectification circuit and the control circuit as described above.

An embodiment of the present disclosure further provides a control method for suppressing reverse current surge, comprising: obtaining a voltage signal from a reverse surge current when the reverse surge current appears on a primary side of a switch power circuit of a synchronous rectification circuit; continuously outputting a first control signal in a preset first time period when the voltage signal is greater than a first voltage threshold; and controlling to switch off switch tubes of a secondary side of the switch power circuit of the synchronous rectification circuit according to the first control signal.

Through the control circuit, the control method, and the power supply device provided by the embodiments of the present disclosure, the voltage signal from the reverse surge current is detected when the reverse current surge occurs, and then the switch tubes of the secondary side of the switch power circuit of the synchronous rectification circuit is switched off, and therefore, the reverse current surge is suppressed effectively, so as to protect the safety of a switch power supply of the synchronous rectification circuit effectively and ensure reliability of the power supply; meanwhile, the working efficiency of the power supply is guaranteed.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

FIG. 1 is a circuit diagram of a switch power circuit of a synchronous rectification circuit in the prior art;

FIG. 2 is a schematic structural view of a control circuit according to a first embodiment of the present disclosure;

DETAILED DESCRIPTION OF THE EMBODIMENTS

Figure 3:
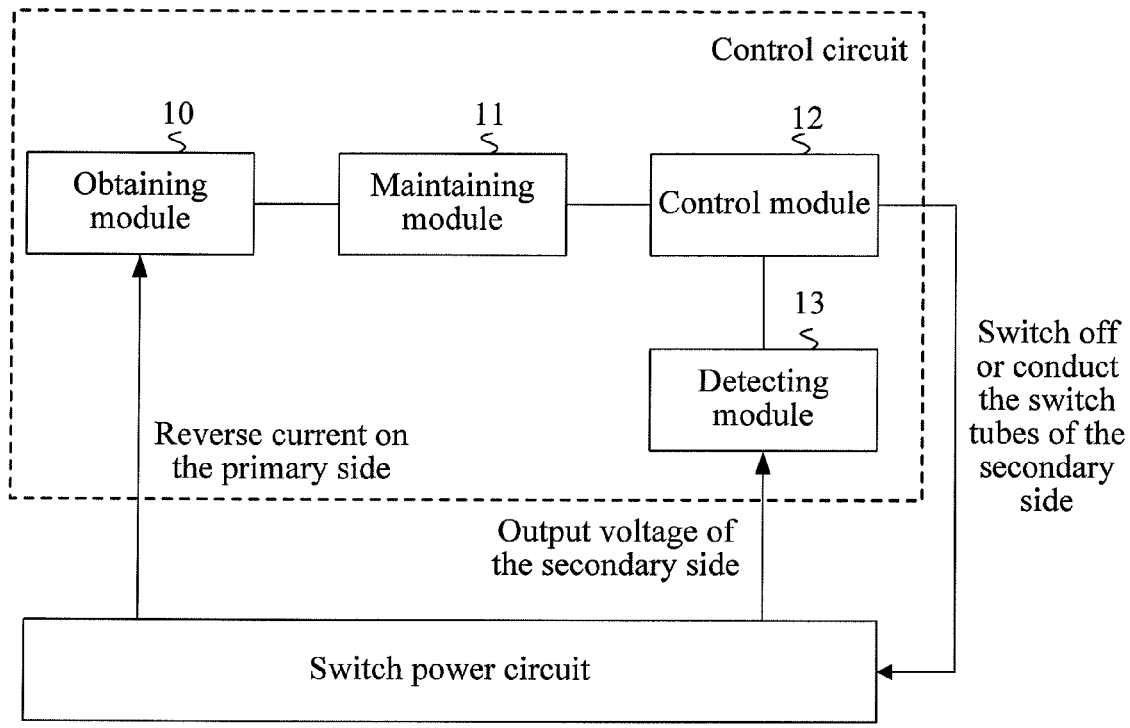
FIG. 3 is a schematic structural view of a control circuit according to a second embodiment of the present disclosure.

In order to make the objectives, technical solutions, and advantages of the present disclosure clearer, the technical solutions of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

FIG. 2 is a schematic structural view of a control circuit according to a first embodiment of the present disclosure. As shown in FIG. 2, the control circuit of this embodiment includes an obtaining module 10, a maintaining module 11, and a control module 12.

The obtaining module 10 is adapted to obtain a voltage signal produced by a reverse surge current when the reverse surge current appears on a primary side of a switch power circuit of a synchronous rectification circuit. The maintaining module 11 is adapted to continuously output a first control signal in a preset first time period when the voltage signal is greater than a preset first voltage threshold. The control module 12 is adapted to switch off switch tubes of a secondary side of the switch power circuit of the synchronous rectification circuit according to the first control signal.

For example, when an input terminal of a switch power supply of the synchronous rectification circuit produces a low-impedance fall, the primary side of the switch power circuit of the synchronous rectification circuit will produce a great reverse current surge. The obtaining module 10 of the control circuit in this embodiment is connected to the primary side of the switch power circuit of the synchronous rectification circuit. When a switch tube rectification unit of the primary side of the switch power circuit of the synchronous rectification circuit has the reverse current surge and the reverse surge current appears, the obtaining module 10 obtains the voltage signal produced by the reverse surge current, that is, a reverse voltage signal, from the primary side of the switch power circuit of the synchronous rectification circuit. The maintaining module 11 is connected to the obtaining module 10. The maintaining module 11 continuously outputs the first control signal in the preset first time period when the voltage signal obtained by the obtaining module 10 is greater than the preset first voltage threshold. The control module 12 is connected to the maintaining module 11. The control module 12 switches off the switch tubes of the secondary side of the switch power circuit of the synchronous rectification circuit according to the first control signal output by the maintaining module 11, so as to prevent a reverse current when the reverse current surge occurs, and prevent over-current damage to the switch tube of the switch power circuit of the synchronous rectification circuit.

The control circuit of this embodiment detects and controls the voltage signal produced by the reverse surge current when reverse current surge occurs on the primary side of the switch power circuit of the synchronous rectification circuit, and then switches off the switch tubes of the secondary side of the switch power circuit of the synchronous rectification circuit, so at to effectively suppress the reverse current surge, and ensure the safety of the switch tubes of the switch power circuit of the synchronous rectification circuit.

FIG. 3 is a schematic structural view of a control circuit according to a second embodiment of the present disclosure. As shown in FIG. 3, on the basis of the first embodiment, the control circuit of this embodiment further includes a detecting module 13.

The detecting module 13 is connected to the secondary side of the switch power circuit of the synchronous rectification circuit, and is adapted to output a second control signal when an output voltage of the secondary side of the switch power circuit of the synchronous rectification circuit is greater than a preset second voltage threshold. The detecting module 13 is also connected to the control module 12. The control module 12 may control to conduct the switch tubes of the secondary side of the switch power circuit of the synchronous rectification circuit according to the second control signal output by the detecting module 13.

Since when a reverse current surge occurs, the solution of the first embodiment is used to quickly switch off the switch tubes of the secondary side of the switch power circuit of the synchronous rectification circuit, so as to ensure safety of the switch tubes. However, after the switch tubes of the secondary side of the switch power circuit of the synchronous rectification circuit are switched off quickly, the reverse current of an output terminal of the secondary side is not released in time, excessive output voltage of an output voltage terminal of the secondary side may be generated, resulting in a potential safety risk to the system. The detecting module 13 is configured in this embodiment, and is connected to the output terminal of the secondary side of the switch power circuit of the synchronous rectification circuit. When the detecting module 13 detects an over-voltage output of the output voltage of the output voltage terminal of the secondary side of the switch power circuit of the synchronous rectification circuit, that is, when the output voltage of the secondary side is greater than the preset second voltage threshold, the detecting module 13 outputs the second control signal, so as to conduct the driver of the switch tubes of the secondary side of the switch power circuit of the synchronous rectification circuit, and release the reverse current of the output terminal of the secondary side of the switch power circuit of the synchronous rectification circuit.

In the process for suppressing the reverse current surge, the control circuit of this embodiment may prevent excessive output voltage of the output voltage terminal of the secondary side of the switch power circuit of the synchronous rectification circuit, so as to avoid damage to components of the switch power circuit of the synchronous rectification circuit, and effectively protect the safety of the switch power circuit of the synchronous rectification circuit.

In the above two embodiments, the switching off or conducting the switch tubes of the secondary side of the switch power circuit of the synchronous rectification circuit is specifically switching off or conducting the driver of the switch tubes of the secondary side of the switch power circuit of the synchronous rectification circuit, so as to switch off or conduct the switch tubes of the secondary side of the switch power circuit of the synchronous rectification circuit. Thus, the switch tubes of the secondary side of the switch power circuit of the synchronous rectification circuit can be controlled flexibly.

Figure 4:
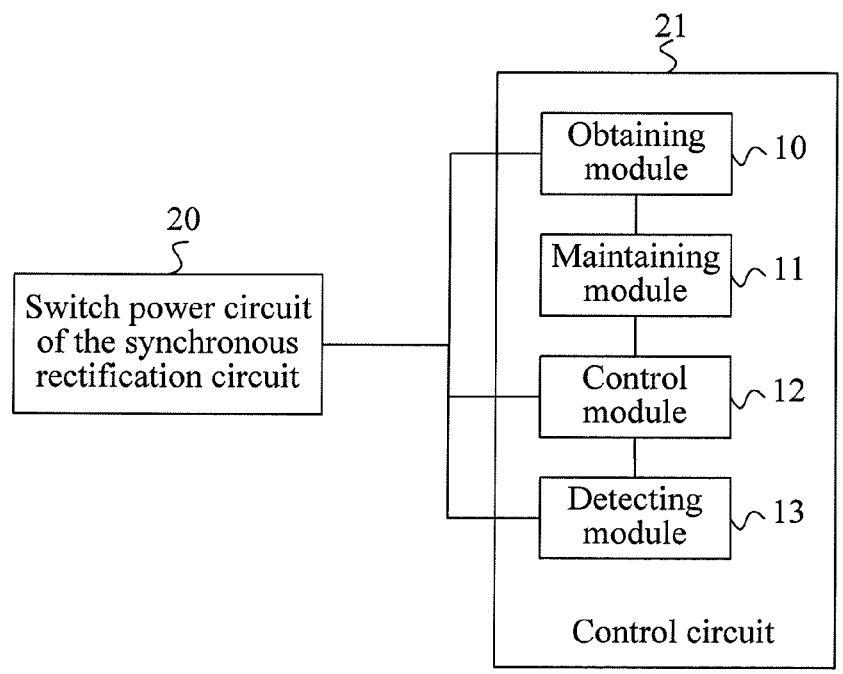
FIG. 4 is a schematic structural view of a power supply device according to a third embodiment of the present disclosure.

FIG. 4 is a schematic structural view of a power supply device according to a third embodiment of the present disclosure. As shown in FIG. 4, the power supply device of this embodiment includes a switch power circuit 20 of a synchronous rectification circuit and a control circuit 21.

The control circuit 21 may specifically include an obtaining module 10, a maintaining module 11, and a control module 12. The obtaining module 10 is connected to the switch power circuit 20 of the synchronous rectification circuit, and is adapted to obtain a voltage signal produced by a reverse surge current when the reverse surge current appears on a primary side of the switch power circuit 20 of the synchronous rectification circuit. The maintaining module 11 is connected to the obtaining module 10, and is adapted to continuously output a first control signal in a preset first time period when the voltage signal is greater than a preset first voltage threshold. The control module 12 is connected to the switch power circuit 20 of the synchronous rectification circuit, and is configured to control and switch off switch tubes of a secondary side of the switch power circuit 20 of the synchronous rectification circuit according to the first control signal output by the maintaining module 11.

When a reverse current surge occurs, the power supply device of this embodiment detects the obtained voltage signal, and then switches off the switch tubes of the secondary side of the switch power circuit of the synchronous rectification circuit, thereby effectively suppressing the reverse current surge, and ensuring safety of the switch tubes of the switch power circuit of the synchronous rectification circuit. As a result, both the working efficiency of the power supply and reliability of the power supply are improved.

As shown in FIG. 4, the control circuit 21 of the power supply device in this embodiment further includes a detecting module 13. The detecting module 13 is connected to the switch power circuit 20 of the synchronous rectification circuit and the control module 12 respectively, and is adapted to output a second control signal when an output voltage of the secondary side of the switch power circuit of the synchronous rectification circuit is greater than a preset second voltage threshold, so that the control module 12 controls to conduct the switch tubes of the secondary side of the switch power circuit of the synchronous rectification circuit according to the second control signal.

In the process for suppressing the reverse current surge, the power supply device of this embodiment may prevent excessive output voltage of an output terminal of the secondary side of the switch power circuit of the synchronous rectification circuit, so as to avoid damage to components of the switch power circuit of the synchronous rectification circuit, and effectively protect the safety of the switch power circuit of the synchronous rectification circuit.

At the same time, since an anti-reverse diode or an MOS transistor is configured in a main loop of a switch power supply of the rectification circuit in the prior art, a great fixed power consumption will be brought into the main loop; however, in the embodiments of the present disclosure, it is unnecessary to configure the anti-reverse diode or the MOS transistor in the main loop, and instead, an additional control circuit is configured to perform control. Thus, the fixed power consumption is not brought into the main loop, and the power consumption of the control circuit is much smaller than the fixed power consumption brought in the main loop. Therefore, the embodiments of the present disclosure may effectively save the power consumption, and improve working efficiency of the power supply.

Refer to the above first and second embodiments for more information about the control circuit 21 of the power supply device in this embodiment, which will not be described herein again.

Figure 5:
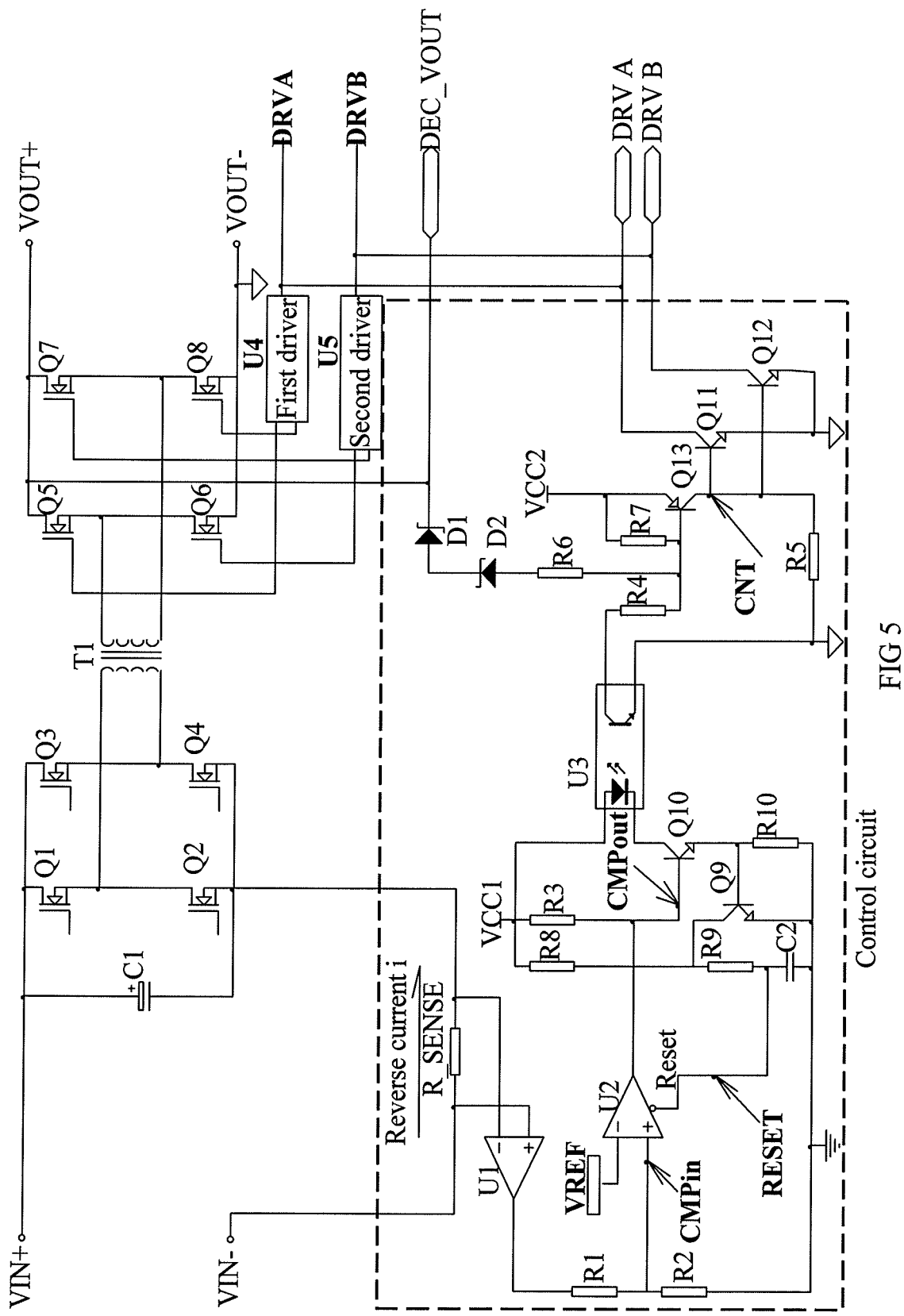
FIG. 5 is a circuit diagram of a power supply device according to a fourth embodiment of the present disclosure.

FIG. 5 is a circuit diagram of a power supply device according to a fourth embodiment of the present disclosure. As shown in FIG. 5, the power supply device uses the control circuit shown in a dashed box of the FIG. 5 to control the switch power circuit of the synchronous rectification circuit in FIG. 1.

As shown in FIG. 5, on the basis of the embodiments shown in FIG. 2, FIG. 3 and FIG. 4, the obtaining module of the control circuit of the corresponding embodiment includes a sampling resistor R_SENSE and a signal amplifier U1.

The sampling resistor R_SENSE is configured on a primary side of the switch power circuit of the synchronous rectification circuit, and is adapted to detect whether the primary side of the switch power circuit of the synchronous rectification circuit has a zero-crossing reverse current i. Since a signal of the reverse current i is relatively weak, a voltage signal can be obtained by using the signal amplifier U1 to obtain an initial voltage signal produced by the reverse current i from two ends of the sampling resistor R_SENSE, and amplifying the voltage signal. The sampling resistor R_SENSE of this embodiment may be a common resistor, or a line impedance, or a direct current impedance of a common mode or differential mode inductor, or a fore anti-reverse or soft-start MOS transistor conduction resistor. It should be noted that the reverse current is detected through the current sampling resistor in this embodiment. Similarly, a method for detecting an input voltage can also be used to detect the reverse current.

As shown in FIG. 5, the maintaining module of the fourth embodiment includes two voltage divider resistors connected in series, namely, a first voltage divider resistor R1 and a second voltage divider resistor R2, a comparator U2, and a first control unit.

One end of the first voltage divider resistor R1 is connected to an input terminal of the amplifier U1; the other end is connected with the second voltage divider resistor R2 in series and then is grounded and at the same time, the other end is connected to the input terminal of the comparator U2. The divided voltage signal is obtained from the voltage signal input by the amplifier U1 after being divided by the first voltage divider resistor R1; and the divided voltage signal CMPin is output to the input terminal of the comparator U2. The comparator U2 compares the received divided voltage signal CMPin and a preset first voltage threshold Vref1, and outputs a first control signal CMPout when the divided voltage signal CMPin is greater than the first voltage threshold Vref1. The first voltage divider resistor R1 and the second voltage divider resistor R2 are designed to help flexibly design the amplification ratio of the amplifier U1 and the first voltage threshold Vref1.

As shown in FIG. 5, a Reset pin is configured on the comparator U2. The Reset pin is at a first level (high level in this embodiment of the present disclosure), and the comparator U2 provides a "maintaining" function. At this time, the output of the comparator U2 maintains the first control signal CMPout output when the comparator U2 is triggered. At this time, the comparator U2 can be regarded in a state of inputting, comparing, triggering and maintaining. When the Reset pin of the comparator U2 is at a second level (low level in this embodiment of the present disclosure), the comparator U2 outputs "reset", and recovers to a state of comparing and outputting, that is, outputs the signal according to a comparing result. At this time, the comparator U2 can be regarded in a state of inputting, comparing and outputting.

Specifically, the first control unit controls the level of the Reset pin. As shown in FIG. 5, the first control unit includes a capacitor C2, a first power supply VCC1 and a first pull-up resistor R3, a current limiting resistor R8, a first resistor R9 and a second resistor R10, and a first switch tube Q9 and a second switch tube Q10. In this embodiment of the present disclosure, the switch tubes of the control circuit are implemented as transistors. Other methods (such as MOS transistors) also can be used to implement the switch tubes in actual applications, since these implementation technologies are known for persons skilled in the art, details thereof will not be described herein again. Referring to FIG. 5, one end of the capacitor C2 is connected to the Reset pin, and the other end is grounded. One end of the capacitor C2 is also connected with the first power supply VCC1 through connection in series with the current limiting resistor R8 and the first resistor R9. The first power supply VCC1 is also connected to the second switch tube Q10 through the first pull-up resistor R3. When the comparator U2 outputs the first control signal CMPout, the second switch tube Q10 is conducted, so that the first switch tube Q9 is conducted. After the first switch tube Q9 is conducted, the capacitor C2 discharges through a loop composed by the first resistor R9, the first switch tube Q9, and the capacitor C2, so that the voltage of the Reset pin connected to the capacitor C2 reduces, that is, the level of the Reset pin is reduced to the low level from the high level. The duration from the time when the voltage signal is detected to be greater than the first voltage threshold and the comparator U2 starts to output the first control signal CMPout to the time when the Reset pin is reduced to the low level is a first time period. A length of the first time period can be preset through a preset resistance of the first resistor R9 (in the discharge loop of the capacitor C2, and related to the discharge time of the capacitor C2). During the first time period, the Reset pin is at the high level, and the comparator U2 is in the state of inputting, comparing, triggering and maintaining, and provides the "maintaining" function. At this time, the comparator U2 continuously outputs the first control signal CMPout according to the comparison between the voltage signal and the first voltage threshold Vref1 until the Reset pin is reduced to the low level. The length of the first time period should be greater than or equal to working time of pulse modulation of the MOS transistor driver of the primary side, so as to eliminate the potential safety risk of the switch power supply of the synchronous rectification circuit. The Reset pin is reduced to the low level, the output of the comparator U2 is "reset", and at this time, the comparator U2 is in the state of inputting, comparing and outputting, that is, the input voltage signal is compared with the first voltage threshold Vref1, and the signal is output according to a comparing result.

As shown in FIG. 5, the control module includes an optical coupler U3 and a second control unit. One end of a photosensitive diode in the optical coupler U3 is connected to the first power supply VCC1, and the other end is connected to the second switch tube Q10. When the comparator U2 outputs the first control signal CMPout, and conducts the second switch tube Q10, the photosensitive diode in the optical coupler U3 is driven to emit photoelectrons, the transistor in the optical coupler U3 is conducted to receive the photoelectrons, and the second control unit is conducted to work.

As shown in FIG. 5, the second control unit includes a second power supply VCC2, a third resistor R4, a fourth resistor R7, and a grounding resistor R5, a third switch tube Q11, and a fourth switch tube Q12 and a first transistor Q13. As shown in FIG. 5, the first transistor Q13 is a PNP MOS transistor. An emitter of the first transistor Q13 is connected to the second power supply VCC2, and the second power supply VCC2 is connected to a base of the first transistor Q13 through the fourth resistor R7, so as to control a conduction threshold of the first transistor Q13. A collector of the first transistor Q13 is grounded through the grounding resistor R5, the base of the first transistor Q13 is connected to the collector of the transistor in the optical coupler U3 through the third resistor R4, and the emitter of the transistor in the optical coupler U3 is grounded. The third switch tube Q11 and the fourth switch tube Q12 are connected to the collector of the first transistor Q13 respectively (or through the resistors respectively). When the optical coupler U3 is conducted and works, the first transistor Q13 is conducted, and at this time, the level CNT of the collector of the first transistor Q13 is the high level, so as to control and conduct the third switch tube Q11 and the fourth switch tube Q12. Referring to FIG. 5, a working process of a power circuit of the synchronous rectification circuit is shown. In FIG. 5, a first driving signal DRVA and a second driving signal DRVB are input signals of driving of a first driver U4 and a second driver U5 respectively. As shown in FIG. 5, after the third switch tube Q11 and the fourth switch tube Q12 are conducted, the first driving signal DRVA and the second driving signal DRVB are short-circuited (that is to say, pull down the DRVA and the DRVB to zero), so as to switch off an amplified driving signal of the synchronous rectification output by the first driver U4 and the second driver U5, and switch off the switch tubes Q5 to Q8 of the secondary side of the switch power circuit of the synchronous rectification circuit.

The control circuit and the corresponding power supply device of this embodiment acquire and detect the voltage signal produced by a reverse surge current when the reverse current surge occurs, and switch off the switch tubes of the secondary side of the switch power circuit of the synchronous rectification circuit, so as to effectively suppress the reverse current surge, and ensure the safety of the switch tubes of the switch power supply of the synchronous rectification circuit and ensure reliability of the power supply. At the same time, since an anti-reverse diode or an MOS transistor is configured in a main loop of the switch power supply of the rectification circuit in the prior art, a great fixed power consumption is brought into the main loop; however, in the embodiments of the present disclosure, it is unnecessary to configure the anti-reverse diode or the MOS transistor in the main loop, and an additional control circuit is configured to perform the control instead. Thus, the fixed power consumption is not brought into the main loop, and the power consumption of the control circuit is much smaller than the fixed power consumption brought in the main loop. Therefore, the embodiments of the present disclosure can effectively save the power consumption, and improve working efficiency of the power supply.

As shown in FIG. 5, the control circuit of this embodiment further includes a detecting module, where the detecting module includes at least one Zener diode. As shown in FIG. 5, two Zener diodes connected in series, that is, a first Zener diode D1 and a second Zener diode D2, and a second pull-up resistor R6 are taken as an example. The first Zener diode D1 is connected to an output voltage terminal of the secondary side of the switch power circuit of the synchronous rectification circuit, and the second Zener diode D2 is connected to the base of the first transistor Q13 through the second pull-up resistor R6.

As shown in FIG. 5, when the output voltage of the secondary side of the switch power circuit of the synchronous rectification circuit is greater than a second voltage threshold (the second voltage threshold equals a sum of Zener voltages of the first Zener diode D1 and the second Zener diode D2) commonly determined by the first Zener diode D1 and the second Zener diode D2, the first Zener diode D1 and the second Zener diode D2 are conducted, and the second pull-up resistor R6 can be pulled up to increase a base voltage of the first transistor Q13, so as to switch off the first transistor Q13. At this time, correspondingly, the level CNT of the base of the first transistor Q13 is the low level. And correspondingly, the third switch tube Q11 and the fourth switch tube Q12 are switched off, so as to recover to input the first driving signal DRVA and the second driving signal DRVB to the first driver U4 and the second driver U5. The first driving signal DRVA and the second driving signal DRVB control to conduct the first driver U4 and the second driver U5, so as to conduct the switch tubes Q5 to Q8 of the secondary side of the switch power circuit of the synchronous rectification circuit, and release the voltage of the output terminal of the secondary side of the switch power circuit of the synchronous rectification circuit. Thus, the CNT level signal is the second control signal, and can control to switch off or conduct the switch tubes of the secondary side of the switch power circuit of the synchronous rectification circuit according to the high or low CNT level signal.

As shown in FIG. 5, the sampling resistor R_SENSE is used to detect the reverse current, and since the signal of the reverse current is relatively weak, the signal amplifier U1 is used to obtain the voltage signal from two ends of the sampling resistor R_SENSE. After being divided by the first voltage divider resistor and the second voltage divider resistor, the divided voltage signal CMPin is input to the input terminal of the comparator U2. The comparator U2 compares the received voltage signal and the preset first voltage threshold Vref1. When the voltage signal is greater than the first voltage threshold Vref1, the comparator U2 outputs the first control signal CMPout, so as to conduct the second switch tube Q10. At the same time, the conduction of the second switch tube Q10 can open the first switch tube Q9, so that the capacitor C2 and the first switch tube Q9 can form a loop, and the capacitor C2 starts to discharge. Thus, the level of the Reset pin of the comparator U2 connected to a positive terminal of the capacitor C2 is reduced to the low level from the high level.

As shown in FIG. 5, after the comparator U2 outputs the first control signal CMPout and conducts the second switch tube Q10, the optical coupler U3 is driven to work so as to conduct the first transistor Q13. After the first transistor Q13 is conducted, the third switch tube Q11 and the fourth switch tube Q12 are conducted, so as to stop sending the first driving signal DRVA and the second driving signal DRVB to the first driver U4 and the second driver U5 of the switch tubes of the secondary side of the switch power circuit of the synchronous rectification circuit respectively. The first driving signal DRVA and the second driving signal DRVB control to switch off or close the first driver U4 and the second driver U5 of the switch tubes of the secondary side of the switch power circuit of the synchronous rectification circuit, so as to switch off or close the switch tubes of the secondary side of the switch power circuit of the synchronous rectification circuit. For example, the first driving signal DRVA controls to switch off or close the first driver U4, so as to control and switch off or close the switch tubes Q5 and Q8 of the secondary side. The second driving signal DRVB controls to switch off or close the second driver U5, so as to control and switch off or close the switch tubes Q6 and Q7 of the secondary side.

In the process for suppressing the reverse current surge, the control circuit and the corresponding power supply device of this embodiment may prevent excessive voltage of an output terminal of the secondary side of the switch power circuit of the synchronous rectification circuit, so as to avoid damage to components of the switch power circuit of the synchronous rectification circuit, and effectively protect the safety of the switch power circuit of the synchronous rectification circuit.

Figure 6:
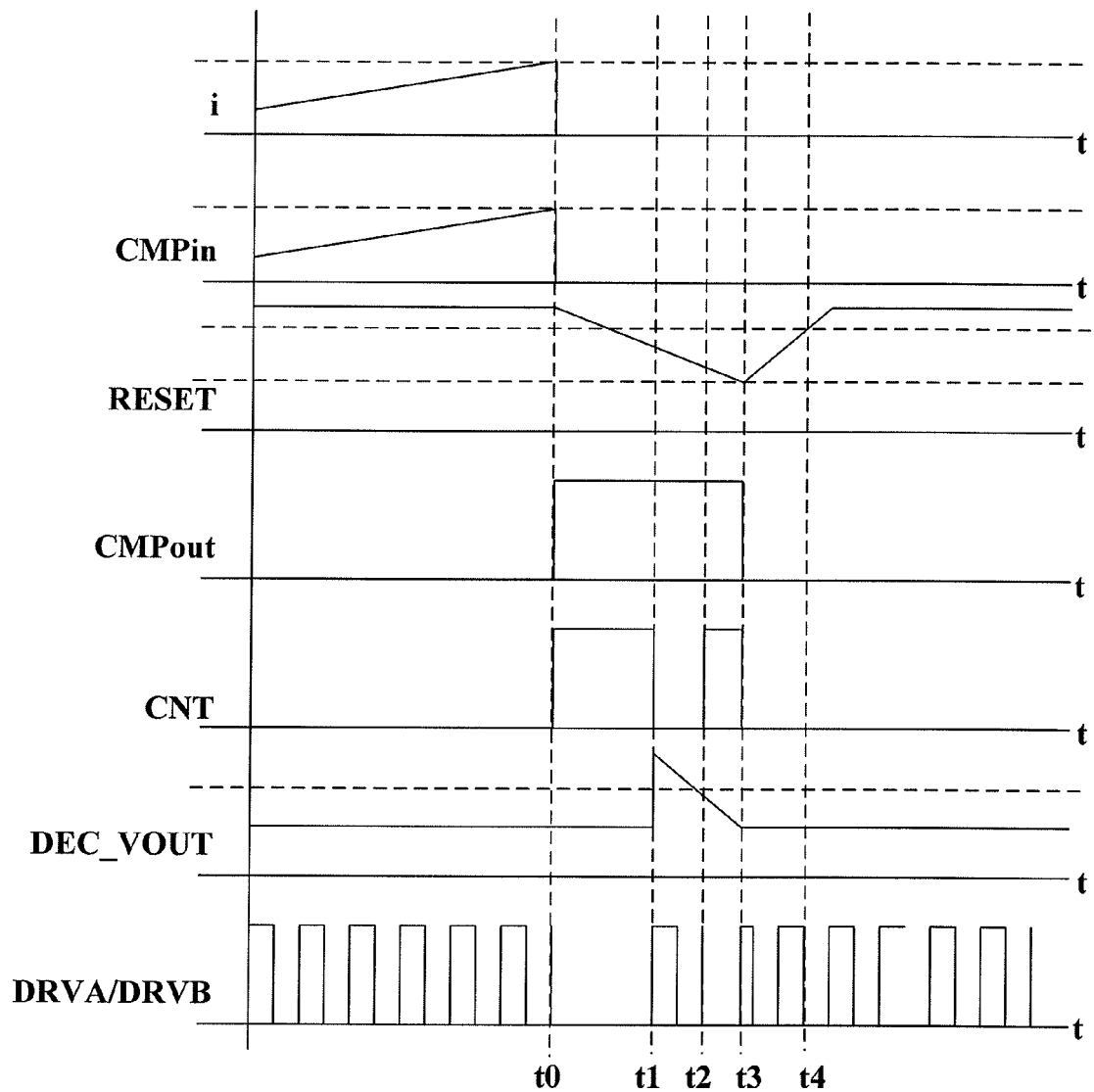
FIG. 6 shows a signal timing waveform of the circuit shown in FIG. 5.

FIG. 6 shows a signal timing waveform of the circuit shown in FIG. 5. The detailed working process of the circuit shown in FIG. 5 will be described in the following with reference to the circuit shown in FIG. 5 and the signal timing shown in FIG. 6.

As shown in FIG. 6, at t0 moment, on the primary side of the switch power circuit of the synchronous rectification circuit, when an input reverse current i exceeds a certain threshold, the comparator U2 determines that reverse current occurs on an input terminal of the power supply at this time, and the comparator U2 outputs the first control signal CMPout and triggers the first control signal CMPout to high level. Since the level of Reset pin of the comparator U2 is high level, the output state of the first control signal CMPout is maintained, and the second switch tube Q10 is conducted at this time, and signals are transmitted to the secondary side through the high-speed optical coupler U3 to conduct the first transistor Q13. Correspondingly, the CNT level of the collector of the first transistor Q13 is the high level, and the third switch tube Q11 and the fourth switch tube Q12 connected to the collector of the first transistor Q13 are conducted, so as to cut off the input of the first driving signal DRVA and the second driving signal DRVB to the first driver U4 and the second driver U5, in which the first driver U4 controls the switch tubes Q5 and Q8 of the secondary side, and the second driver U5 controls the switch tubes Q6 and Q7 of the secondary side. Therefore, the first driving signal DRVA controls to switch off the switch tubes Q5 and Q8 of the secondary side, and the second driving signal DRVB controls to switch off the switch tubes Q6 and Q7 of the secondary side, so as to prevent continual increase of the reverse current of the switch power supply of the synchronous rectification circuit. At the same time, at the t0 moment, since the first control signal CMPout is at high level, the first switch tube Q9 is conducted to enable the voltage of the Reset pin to reduce gradually.

The state lasts to a t1 moment. When over-voltage of an output voltage DEC_VOUT of the switch power circuit of the synchronous rectification circuit is detected, the first Zener diode D1 and the second Zener diode D2 are conducted, so as to increase the voltage of the base of the first transistor Q13. The first transistor Q13 is cut off through the second pull-up resistor R6, and the CNT level of the collector of the first transistor Q13 is the low level, so the third switch tube Q11 and the fourth switch tube Q12 are switched off, and the input of the first driving signal DRVA and the second driving signal DRVB to the first driver U4 and the second driver U5 is recovered, in which the first driver U4 and the second driver U5 control and conduct the switch tubes Q5 and Q8 of the secondary side. The output voltage DEC_VOUT of the switch power circuit of the synchronous rectification circuit is clamped by the primary side to prevent output over-voltage.

When the output over-voltage recovers to a normal range, at t2 moment, the first Zener diode D1 and the second Zener diode D2 are cut off. Since the output state of the first control signal CMPout maintains unchanged, the CNT level of the collector of the first transistor Q13 still outputs to be high, and the third switch tube Q11 and the fourth switch tube Q12 are conducted respectively, so as to stop the input of the first driving signal DRVA and the second driving signal DRVB to the first driver U4 and the second driver U5, thereby controlling to switch off the switch tubes Q5 to Q8 of the secondary side of the switch power supply of the synchronous rectification circuit, and preventing further increase of the reverse current of the switch power supply of the synchronous rectification circuit. At the same time, at the t2 moment, the output of the first control signal CMPout is the high, and the first switch tube Q9 is conducted to enable the voltage of the RESET pin to reduce gradually.

Until t3 moment, the gradually reduced Reset level is low. At this time, since no reverse current state is detected in the input and the output of the first control signal CMPout is low, the CNT level of the collector of the first transistor Q13 is low, and the third switch tube Q11 and the fourth switch tube Q12 are switched off. Thus, the input of the first driving signal DRVA and the second driving signal DRVB to the first driver U4 and the second driver U5 is recovered; and the switch power circuit of the synchronous rectification circuit recovers to a normal working state.

Figure 7:
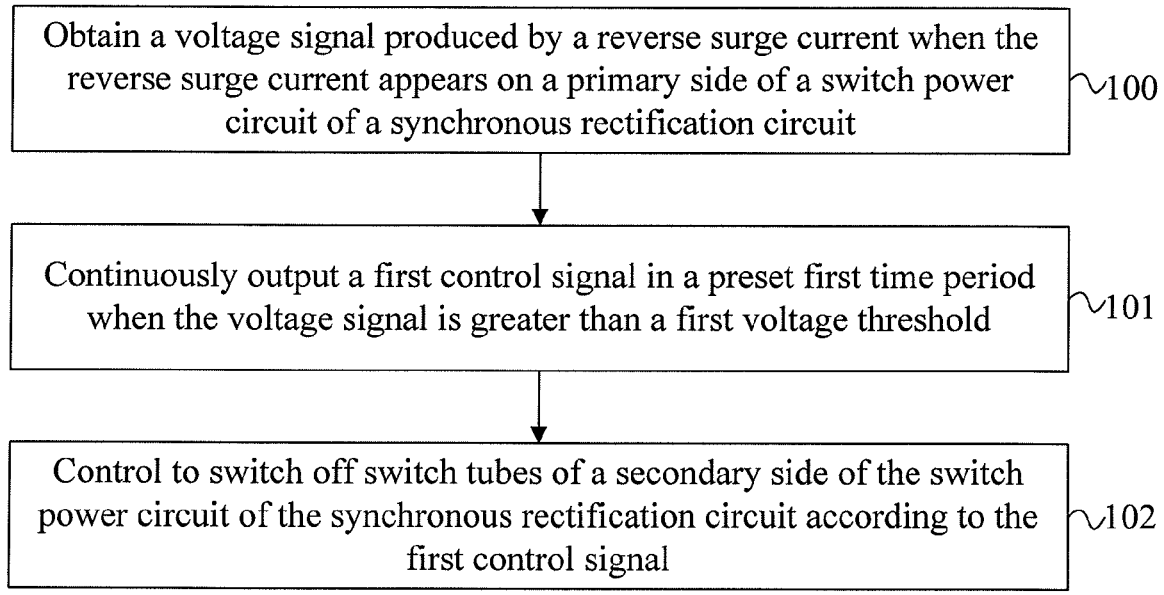
FIG. 7 is a flow chart of a control method for suppressing a reverse current surge according to a fifth embodiment of the present disclosure.

FIG. 7 is a flow chart of a control method for suppressing a reverse current surge according to a fifth embodiment of the present disclosure. This embodiment is implemented by using a control circuit. As shown in FIG. 7, the control method for suppressing the reverse current surge of this embodiment specifically includes the following steps.

Block 100: A voltage signal produced by a reverse surge current is obtained when the reverse surge current appears on a primary side of a switch power circuit of a synchronous rectification circuit.

Block 101: When the voltage signal is greater than a first voltage threshold, a first control signal is continuously output in a preset first time period.

Block 102: Control to switch off switch tubes of a secondary side of the switch power circuit of the synchronous rectification circuit according to the first control signal.

Specifically, in a switch power supply of the synchronous rectification circuit, when an input power supply produces a low-impedance fall, the primary side of the switch power circuit of the synchronous rectification circuit will produce a great reverse current surge. When the reverse current appears on a rectification unit of the switch tube of the primary side of the switch power supply of the synchronous rectification circuit, the voltage signal produced by the reverse current is obtained. The first control signal is continuously output in the preset first time period when the obtained voltage signal is greater than the first voltage threshold. Finally, according to the first control signal, the switch tubes of the secondary side of the switch power supply of the synchronous rectification circuit are switched off, so as to avoid damage to the switch tubes of the switch power circuit of the synchronous rectification circuit when the reverse surge current occurs.

Through the control method for suppressing the reverse current surge of this embodiment, the voltage signal produced by the reverse surge current is detected when the reverse current surge occurs, and then the switch tubes of the secondary side of the switch power circuit of the synchronous rectification circuit is switched off, so as to effectively suppress the reverse current surge and ensure the safety of the switch tubes of the switch power supply of the synchronous rectification circuit and reliability of the power supply. The technical solution of this embodiment of the present disclosure also ensures the working efficiency of the power supply.

Figure 8:
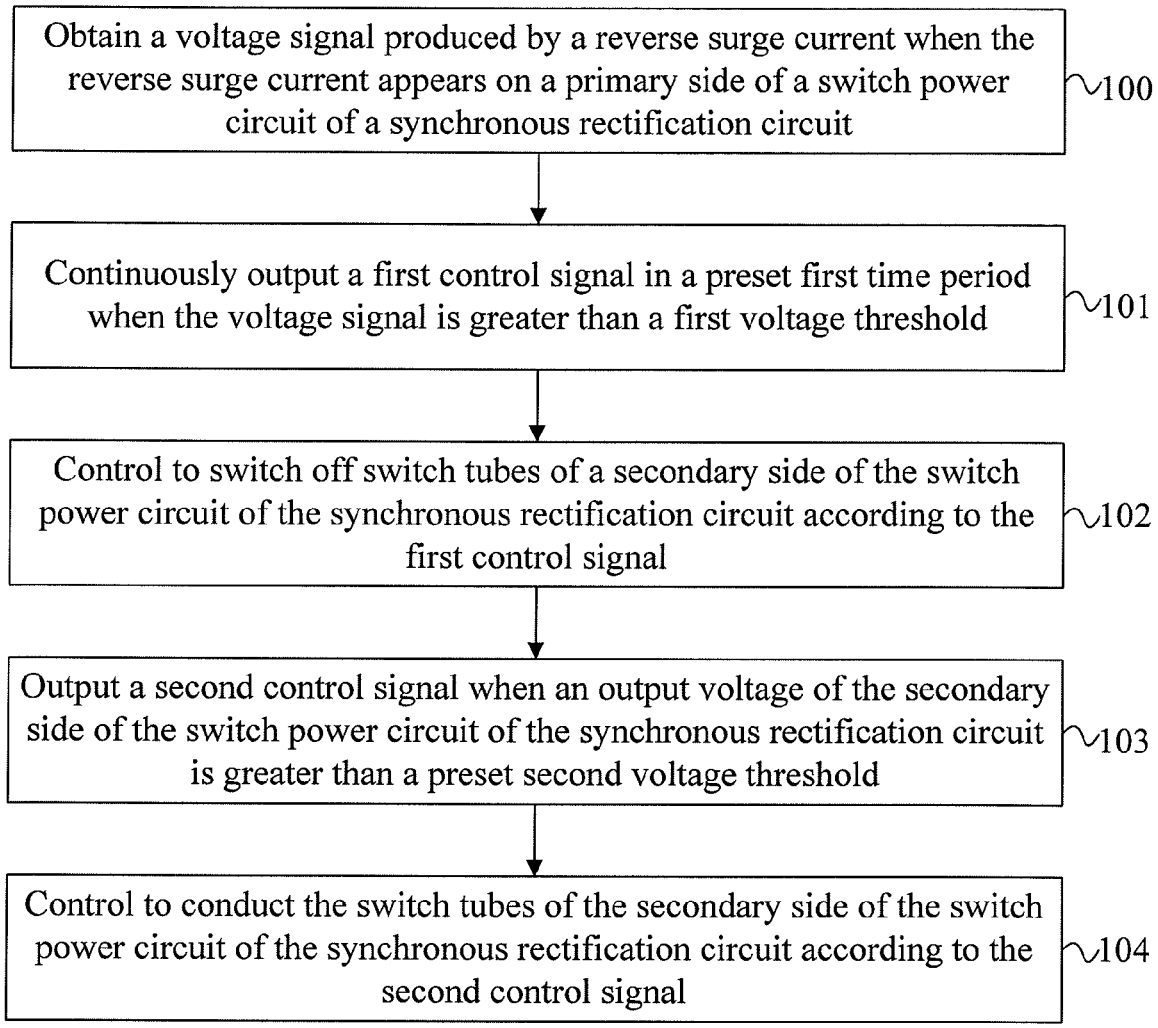
FIG. 8 is a flow chart of a control method for suppressing a reverse current surge according to a sixth embodiment of the present disclosure.

FIG. 8 is a flow chart of a control method for suppressing a reverse current surge according to a sixth embodiment of the present disclosure. On the basis of the embodiment shown in FIG. 7, as shown in FIG. 8, after the above step 102, the control method for suppressing the reverse current surge of this embodiment may specifically include the following steps.

Block 103: A second control signal is output when an output voltage of the secondary side of the switch power circuit of the synchronous rectification circuit is greater than a preset second voltage threshold.

Block 104: Control to conduct the switch tubes of the secondary side of the switch power circuit of the synchronous rectification circuit according to the second control signal.

Specifically, when the reverse current surge occurs, the solution of the fifth embodiment is used to quickly switch off the switch tubes of the secondary side of the switch power circuit of the synchronous rectification circuit, so as to ensure safety of the switch tubes. But sometimes, after the switch tubes of the secondary side of the switch power circuit of the synchronous rectification circuit are switched off quickly, as the voltage of the output terminal of the secondary side is not released in time, the voltage of the output terminal of the secondary side may be too high, and a potential safety risk of the system is generated. Through this embodiment, the voltage of the output terminal of the secondary side of the switch power circuit of the synchronous rectification circuit is detected, and when the voltage of the output terminal of the secondary side of the switch power circuit of the synchronous rectification circuit is detected to be an over-voltage, that is, when the output voltage of the secondary side is greater than the preset second voltage threshold, the second control signal is output, so as to conduct the switch tubes of the secondary side of the switch power circuit of the synchronous rectification circuit, and release the voltage of the output terminal of the secondary side of the switch power circuit of the synchronous rectification circuit.

In the process for suppressing the reverse current surge, the control method for suppressing the reverse current surge of this embodiment may prevent excessive output voltage of the output terminal of the secondary side of the switch power circuit of the synchronous rectification circuit, so as to avoid damage to components of the switch power circuit of the synchronous rectification circuit, and effectively protect the safety of the switch power circuit of the synchronous rectification circuit and ensure reliability of the power supply. The technical solution of this embodiment of the present disclosure also ensures the working efficiency of the power supply.

The implementation process of the control method for suppressing the reverse current surge of the embodiment shown in FIG. 7 and FIG. 8 is the same as the implementation mechanism of the control circuit or the control circuit in a corresponding power supply device in the corresponding embodiments shown in FIG. 1 to FIG. 6. The details are as described in embodiments of the control circuit, and will not be described herein again.

Those of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program codes, such as a ROM, a RAM, a magnetic disk, and an optical disk.

Finally, it should be noted that the above embodiments are merely provided for describing the technical solutions of the present disclosure, but not intended to limit the present disclosure. It should be understood by persons of ordinary skill in the art that although the present disclosure has been described in detail with reference to the embodiments, modifications can be made to the technical solutions described in the embodiments, or equivalent replacements can be made to some technical features in the technical solutions, as long as such modifications or replacements do not depart from the spirit and scope of the present disclosure.

What is claimed is:

1. A control circuit, comprising:
an obtaining module, connected directly to a power input terminal of a primary side of a switch power circuit of a synchronous rectification circuit and configured to obtain a voltage signal from a reverse surge current when the reverse surge current appears on the power input terminal;
a maintaining module that comprises a comparator with a reset pin and a first control unit and is configured to compare the voltage signal with a preset first voltage threshold and output the first control signal when the voltage signal is greater than the preset first voltage threshold, and continuously output a first control signal in a preset first time period when the voltage signal is greater than the preset first voltage threshold; and
a control module, configured to control and switch off all switch tubes of a secondary side of the switch power circuit of the synchronous rectification circuit according to the first control signal, wherein when the reset pin is at a high level the comparator is in a state of inputting, comparing, triggering, maintaining, continuously outputting the first control signal, and when the reset pin is at a low level, the comparator is reset, and recovers a state of inputting, comparing and outputting, and wherein the first control unit is configured to control and reduce a voltage of the reset pin until the reset pin is at the low level after the first time period when the voltage signal is greater than the first voltage threshold and the comparator outputs the first control signal.

2. The control circuit according to claim 1, further comprising a detecting module, configured to output a second control signal when an output voltage of the secondary side of the switch power circuit of the synchronous rectification circuit is greater than a preset second voltage threshold; wherein
the control module is further configured to control and conduct the switch tubes of the secondary side of the switch power circuit of the synchronous rectification circuit according to the second control signal.

3. The control circuit according to claim 2, wherein the control module is further configured to control and conduct a driver of the switch tubes of the secondary side of the switch power circuit according to the second control signal, so as to conduct the switch tubes of the secondary side of the switch power circuit.

4. The control circuit according to claim 1, wherein the obtaining module comprises a current sampling resistor and a signal amplifier;
the sampling resistor is configured on the primary side of the switch power circuit of the synchronous rectification circuit; and
the signal amplifier is configured to obtain an initial voltage signal produced by the reverse surge current from two ends of the sampling resistor, and amplify the initial voltage signal to obtain the voltage signal.

5. The control circuit according to claim 1, wherein the maintaining module further comprises at least two voltage divider resistors connected in series;
one end of the at least two voltage divider resistors connected in series is connected to the voltage signal and the other end is grounded; the at least two voltage divider resistors connected in series are configured to divide the voltage signal, and output a divided voltage signal to the comparator; and
the comparator is configured to compare the divided voltage signal with the preset first voltage threshold, and output the first control signal when the divided voltage signal is greater than the first voltage threshold.

6. The control circuit according to claim 1, wherein the first control unit comprises a capacitor, and one end of the capacitor is connected to the reset pin and the other end is grounded; and
the one end of the capacitor is also connected to a first power supply through a resistor, and is configured to maintain the one end of the capacitor at the high level when the comparator does not output the first control signal, so as to enable the reset pin to be at the high level; when the comparator outputs the first control signal, the first control signal controls the capacitor to discharge to reduce the voltage of the reset pin until the reset pin is reduced to the low level after the first time period.

7. The control circuit according to claim 1, wherein the control module comprises an optical coupler and a second control unit;
the optical coupler is configured to conduct the second control unit according to the first control signal; and
the second control unit is configured to control and switch off all the switch tubes of the secondary side of the switch power circuit of the synchronous rectification circuit when the second control unit is conducted.

8. The control circuit according to claim 7, wherein the second control unit comprises a second power supply, a first transistor, and a grounding resistor;
an emitter of the first transistor is connected to the second power supply, and the collector of the first transistor is grounded through the resistor; and
the optical coupler controls to switch off all the switch tubes of the secondary side of the switch power circuit of the synchronous rectification circuit by conducting the first transistor.

9. The control circuit according to claim 2, wherein the detecting module comprises at least one Zener diode, and one end of the at least one Zener diode is connected to an output voltage terminal of the secondary side of the switch power circuit of the synchronous rectification circuit, and the other end is connected to the base of the first transistor; and
the at least one Zener diode is configured to switch off the first transistor and control to conduct the switch tubes of the secondary side of the switch power circuit of the synchronous rectification circuit when the output voltage of the secondary side of the switch power circuit of the synchronous rectification circuit is greater than the preset second voltage threshold of the at least one Zener diode.

10. The control circuit according to claim 1, wherein the control module is specifically configured to control and switch off all drivers of all the switch tubes of the secondary side of the switch power circuit of the synchronous rectification circuit according to the first control signal, so as to switch off all the switch tubes of the secondary side of the switch power circuit of the synchronous rectification circuit.

11. A power supply device comprising a switch power circuit of a synchronous rectification circuit and a control circuit comprising:
- an obtaining module, connected directly to a power input terminal of a primary side of the switch power circuit of the synchronous rectification circuit and configured to obtain a voltage signal from a reverse surge current when the reverse surge current appears on the power input terminal;
- a maintaining module comprising a comparator with a reset pin and a first control unit, configured to compare the voltage signal with a preset first voltage threshold, and output the first control signal when the voltage signal is greater than the preset first voltage threshold, continuously output a first control signal in a preset first time period when the voltage signal is greater than the preset first voltage threshold; and
- a control module, configured to control and switch off all switch tubes of a secondary side of the switch power circuit of the synchronous rectification circuit according to the first control signal, wherein when the reset pin is at a first level the comparator is in a state of inputting, comparing, triggering and maintaining, and continuously outputting the first control signal, and when the reset pin is at a second level, the comparator is reset, and recovers a state of inputting, comparing and outputting, and wherein the first control unit is configured to control and reduce a voltage of the reset pin until the reset pin is at low level after the first time period when the voltage signal is greater than the first voltage threshold and the comparator outputs the first control signal.

12. The control circuit according to claim 1, the length of the first time period is greater than working time of pulse modulation of the of the primary side of the switch power circuit of the synchronous rectification circuit.

13. The power supply device according to claim 11, wherein the maintaining module further comprises at least two voltage divider resistors connected in series;
- one end of the at least two voltage divider resistors connected in series is connected to the voltage signal and the other end is grounded; the at least two voltage divider resistors connected in series are configured to divide the voltage signal, and output a divided voltage signal to the comparator; and
- the comparator is configured to compare the divided voltage signal with the preset first voltage threshold, and output the first control signal when the divided voltage signal is greater than the first voltage threshold.

14. The power supply device according to claim 11, wherein the first control unit comprises a capacitor, and one end of the capacitor is connected to the reset pin and the other end is grounded; and
- the one end of the capacitor is also connected to a first power supply through a resistor, and is configured to maintain the one end of the capacitor at a high level when the comparator does not output the first control signal, so as to enable the reset pin to be at high level; when the comparator outputs the first control signal, the first control signal controls the capacitor to discharge to reduce the voltage of the reset pin until the reset pin is reduced to the low level after the first time period.

15. The power supply device according to claim 11, the length of the first time period is greater than working time of pulse modulation of the of the primary side of the switch power circuit of the synchronous rectification circuit.

\* \* \* \* \*